United States Patent Office 3,379,780
Patented Apr. 23, 1968

3,379,780
FLUORINATION PROCESS
Robert E. Robinson, Cincinnati, Ohio, assignor to National Distillers and Chemical Corporation, New York, N.Y., a corporation of Virginia
No Drawing. Filed Apr. 2, 1964, Ser. No. 356,965
12 Claims. (Cl. 260—653.3)

This invention relates to a novel vapor phase process for fluorinating unsaturated organic compounds. More particularly, this invention pertains to the preparation of fluorinated organic compounds by reacting certain unsaturated organic compounds with hydrogen fluoride and an oxygen-containing gas in the presence of a catalyst.

The demand for fluorinated organic compounds such as vinyl fluoride has increased in recent years. Vinyl fluoride, for example, has found use in the preparation of commercial fluorinated polymers. One of the prior art processes for fluorinating hydrocarbons involves the replacement of other halogen atoms in organic compounds by the action of such compounds as antimony pentafluoride, but this interchange process is expensive. A prior art process for preparation of vinyl fluoride involves the reaction of acetylene with hydrogen fluoride, but such a process has the disadvantage of requiring relatively expensive acetylene and produces undesirable by-products such as difluoroethane.

One object of the present invention is to provide a novel process for preparing fluorinated organic compounds which avoids the disadvantages of the prior art processes.

Another object of the present invention is to provide a novel gas or vapor phase process for the preparation of fluorinated organic compounds from certain unsaturated organic compounds.

A further object of the present invention is to provde a novel catalytic process for reacting certain unsaturated organic compounds with hydrogen fluoride and oxygen to produce fluorinated organic compounds.

These and other objects of the present invention will become readily apparent from the ensuing description and illustrative embodiments.

In accordance with this invention it has now been found that fluorinated organic compounds can be readily prepared by passing a gaseous mixture comprising an unsaturated organic compound, hydrogen fluoride and an oxygen-containing gas through or over a bed of Group VIII noble metal or salt thereof. In general, it is preferred to employ the hydrogen fluoride as anhydrous hydrogen fluoride and pure oxygen. It will be understood, however, that neither of these features are critical features of the instant process and that, for example, hydrated hydrogen fluoride and other oxygen-containing gases such as air can be effectively utilized. The fluorinated hydrocarbon product can be readily recovered from the reaction product mixtures by use of conventional procedures such as distillation. Any unreacted hydrogen fluoride or other starting materials can also be recovered and recycled, preferably after dehydration, to the reaction zone.

The unsaturated organic compounds employed in the process of this invention are selected from the group consisting of alkenes, alkadienes, unsaturated monocyclic hydrocarbons (i.e., cycloalkenes), aromatic hydrocarbons, and partially fluorinated derivatives thereof. In general, the unsaturated hydrocarbon feed compound will contain from about 2 to 24 carbon atoms per molecule, and preferably about 2 to 12 carbon atoms per molecule. Typical unsaturated hydrocarbons are as follows:

Alkenes: ethylene, propylene, 1-butene, cis-2-butene, trans-2-butene, 1-dodecene, 1-octene, 1-hexadecene, 1-eicosine, 1-tetracosene, propylene trimer.

Alkadienes: 1,3-butadiene, isoprene, piperylene, 1,7-octadiene, 2,6-octadiene.

Alkatrienes: 1,3,7-octatriene, 1,3,6-octatriene.

Unsaturated monocyclic hydocarbons: cyclohexene, 1,3-cyclohexadiene, 1,4-cyclohexadiene, cyclopentadiene, 3-vinylcyclohexene, 1,5,9-cyclododecatriene, 1,5-cyclooctadiene.

Aromatic hydrocarbons: benzene, toluene, naphthalene, biphenyl, anthracene, ethyl benzene, o-xylene, p-xylene, m-xylene, styrene, α-methylstyrene.

Partially fluorinated derivatives of the above compounds including, for example:

vinyl fluoride
1,1-difluoroethylene
1,2-difluoroethylene,
fluorinated propylenes
fluorinated butadienes
fluorinated benzenes The gaseous feed mixture employed in carrying out the process of this invention comprises about 5 to 80% by volume of hydrogen fluoride, about 3 to 40% by volume of oxygen (or 15 to 85% by volume of air), and about 10 to 90% by volume of the unsaturated hydrocarbon or partially fluorinated unsaturated hydrocarbon. The preferred feed composition will comprise about 10 to 50% by volume of the hydrogen fluoride, about 6 to 25% by volume of oxygen, and about 15 to 75% by volume of the unsaturated organic compound. It is also possible to employ stoichiometric amounts of the reactants, i.e., 40% by volume of hydrogen fluoride, 20% by volume of oxygen, and 40% by volume of the unsaturated organic compound.

As previously noted, the catalyst is a Group VIII noble metal or salts thereof, and especially the metal halide salts. More specifically, the catalyst may be any member of the platinum group or the palladium group of metals or salts thereof. Illustrative catalysts include palladium, platinum, rhodium, ruthenium, osmium, iridium, palladous chloride, palladous bromide, palladous iodide, platinum dichloride, rhodium trichloride ruthenium chloride, iridium chloride, and the like as well as mixtures thereof. Salts of palladium and rhodium, and especially palladium and rhodium halide salts have been found to be quite effective in the present process. However, the metals themselves, and especially palladium metal, are excellent catalysts for the present purposes. Although the use of metal chloride salts have been emphasized above, it will be otherwise understood that bromide and iodide salts of the Group VIII noble metals are also contemplated. The amount of catalyst employed is not an important feature of this invention, and it is only necessary to carry out the desired reaction in the presence of catalytic amounts of the catalyst.

The catalyst may be employed either in an unsupported form or supported on a suitable material such as carbon, alumina, sodium fluoride, aluminum fluoride, calcium fluoride, barium fluoride, and the like. In accordance with one aspect of the present invention it has been found desirable, if not preferred, to employ a supported Group VIII noble metal or salt thereof catalyst. The supported catalysts may be obtained commercially or they may be prepared by any convenient means such as by dissolving the metal salt in a suitable solvent, e.g., water, adding the supporting material, and then evaporating the solvent by heat under vacuum. The amount of Group VIII noble metal in the catalyst will generally range from about 0.2 to 5% by weight, and preferably about 0.5 to 1.5% by weight.

It has also been found desirable, especially when preparing vinyl fluoride, to employ a promoter with the catalyst to obtain higher activity. Such promoters are preferably transition metal salts such as, for example, ferric chloride, ferric bromide, ferric fluoride, cupric chloride, cupric fluoride, manganese chloride, chromium chloride, cobaltous chloride, sodium chloride, gold chloride, nickel chloride, and the like as well as mixtures thereof. The preferred promoters are ferric salts, cupric salts and mixtures thereof. In general, the total amount of promoter employed will be within the range of about 1 to 20% by weight, based on the total weight of the catalyst.

The specific operating conditions employed in practicing the process of this invention are not critical. The reaction is generally carried out at a temperature within the range of about 125° to 325° C., preferably about 160° to 220° C., while the pressures may vary from atmospheric up to about 100 atmospheres or higher. For most purposes the catalyst contact time will vary from about 0.5 to 12 seconds, although a shorter or longer contact time may also be utilized.

The reactants may either be passed into the reaction chamber as separate streams or admixed just prior to introduction. It is also possible to pass a gaseous mixture of the hydrogen fluoride and oxygen through the unsaturated hydrocarbon in liquid form to obtain entrainment of the unsaturated hydrocarbon and the desired feed mixture.

The invention will be more fully understood by reference to the following illustrative embodiments.

Example I

A vertically mounted length of ¾" inner diameter Monel pipe with appropriate top and bottom fittings was charged with 10 g. of 0.5% palladium on 4–12 mesh carbon. The bed was heated to 200° C. and a stream of 175 millimoles of ethylene, 50 millimoles of anhydrous hydrogen fluoride, and 25 millimoles of oxygen per hour was passed into the upper end. The effluent gases were passed through two aqueous potassium hydroxide scrubbers. Analysis of the resulting gaseous mixture by vapor phase chromatography indicated 0.4% vinyl fluoride in the ethylene, which corresponds to a conversion of 1.4% based on hydrogen fluoride and oxygen.

Example II

The procedure of Example I was repeated, except that the catalyst was 10 g. of 1% palladium on ⅛" alumina pellets (Engelhard Industries) and the temperature was 300° C. The amount of vinyl fluoride in the effluent ethylene was 0.2%, which corresponds to a conversion of 0.7% based on hydrogen fluoride and oxygen.

Example III

The procedure of Example II was repeated, except that the catalyst was 10 g. of 1% palladium on 4–8 mesh charcoal and the temperature was 200° C. The amount of vinyl fluoride in the effluent ethylene was 0.1 mole percent, which corresponds to a conversion of 0.35% based on hydrogen fluoride and oxygen.

Example IV

The procedure of Example I was repeated, except that the catalyst was 10 g. 12–30 mesh carbon impregnated with 1 millimole of palladous chloride, 2 millimoles of ferric chloride, and 5 millimoles of cupric chloride, prepared by dissolving the salts in water, adding the carbon, and evaporating the water in a rotary evaporator by heat and suction. The reaction temperature was 175° C. The amount of vinyl fluoride in the effluent ethylene was 7 mole percent, which corresponds to a conversion of 24.5% based on hydrogen fluoride and oxygen.

Example V

The procedure of Example IV was repeated, except that the temperature was 165° C. and the hydrogen fluoride flow rate was 100 millimoles per hour. The effluent ethylene contained 4 mole percent of vinyl fluoride, which corresponds to a conversion of 14% based on oxygen and hydrogen fluoride.

Example VI

The procedure of Example IV was repeated, except that the oxygen flow was 12.5 millimoles per hour. The effluent ethylene contained 1 mole percent of vinyl fluoride, which corresponds to a conversion of 3.5% based on hydrogen fluoride or 7% based on oxygen.

Example VII

The procedure of Example IV was repeated, except that the ethylene flow was reduced to 50 millimoles per hour and 125 millimoles per hour of nitrogen was included in the stream. The effluent ethylene contained 1 mole percent of vinyl fluoride.

Example VIII

The procedure of Example IV was repeated, except that the catalyst was 10 g. of carbon impregnated with 1 millimole of rhodium trichloride, 2 millimoles of ferric chloride and 5 millimoles of cupric chloride and the temperature was 200° C. The effluent ethylene contained 7 mole percent of vinyl fluoride, which corresponds to a conversion of 23.7% based on oxygen and hydrogen fluoride.

Example IX

The procedure of Example IV was repeated, except that 175 millimoles per hour of propylene was substituted for the ethylene in the input stream. The output propylene contained 0.6% of 2-fluoro propene, which corresponds to a conversion of 2.1% based on oxygen and hydrogen fluoride.

Example X

The vertically mounted Monel reactor of Example I was charged with 10 g. of the catalyst described in Example IV and heated to 200° C. A gas flow of 100 millimoles per hour of hydrogen fluoride and 10 millimoles per hour of oxygen was passed through benzene in a Monel bubbler held at 50°–55° C., thus entraining approximately 70 millimoles per hour of benzene before entering the reactor. The exhaust materials were passed into a potassium hydroxide scrubber, followed by a trap immersed in Dry Ice and methanol. The organic layer collected in the scrubber and the trap condensate were combined and analyzed by vapor phase chromatography. The effluent benzene was thus found to contain 1.5 moles percent of fluorobenzene, which corresponds to a conversion of 5.3% based on oxygen.

Example XI

The procedure of Example X was repeated, except that the catalyst was 10 g. of 0.5% palladium of 4–12 mesh carbon. The effluent benzene was found to contain 0.15 mole percent of fluorobenzene, which corresponds to a conversion of 0.5% based on oxygen.

Example XII

The vertically mounted Monel reactor of Example I was charged with 10 g. of the catalyst described in Example IV, and heated to 175° C. A gas flow of 225 millimoles per hour of ethylene and 25 millimoles per hour of oxygen was passed through a bubbler containing 38% aqueous hydrofluoric acid at 100°–105° C. before entering the reactor. The effluent ethylene contained 0.6 mole percent of vinyl fluoride, which corresponds to a conversion of 2.7% based on oxygen.

The above data demonstrate that the process of this invention can be effectively employed to produce a variety of fluorinated hydrocarbons. Moreover, these results show that the present invention requires neither expensive reactants nor expensive reaction equipment.

While particular embodiments of this invention are set forth above, it will be understood that the invention is obviously subject to variations and modifications without departing from its broader aspects. Thus, for example, unsaturated organic compounds having a higher degree of unsaturation than those delineated above may also be utilized in preparing the corresponding fluorinated hydrocarbons.

What is claimed is:

1. A process for preparing fluorinated hydrocarbons which comprises reacting hydrogen fluoride, an oxygen-containing gas and an unsaturated organic compound having from 2 to 24 carbon atoms and selected from the group consisting of alkenes, alkadienes, alkatrienes, unsaturated monocyclic hydrocarbons, and partially fluorinated derivatives thereof at a temperature within the range of 125° to 325° C. in the presence of a catalyst selected from the group consisting of a Group VIII noble metal and a Group VIII noble metal salt.
2. The process of claim 1 wherein said oxygen-containing gas is air.
3. The process of claim 1 wherein said oxygen-containing gas is oxygen.
4. The process of claim 1 wherein said unsaturated organic compound has from 2 to 12 carbon atoms.
5. The process of claim 1 wherein said elevated temperature is within the range of 160° to 220° C.
6. The process of claim 1 wherein said unsaturated organic compound is ethylene.
7. The process of claim 1 wherein said unsaturated organic compound is propylene.
8. The process of claim 1 wherein said catalyst is palladium metal on an inert support.
9. The process of claim 1 wherein said catalyst is palladium chloride on an inert support.
10. The process of claim 1 wherein said catalyst is promoted with a transition metal halide.
11. The process of claim 10 wherein said promoter is a mixture of ferric chloride and cupric chloride.
12. A process for preparing fluorinated hydrocarbons which comprises reacting a mixture containing 10 to 50 percent by volume of hydrogen fluoride, 6 to 25 percent by volume of oxygen, and 15 to 75 percent by volume of an alkene having from 2 to 12 carbon atoms at a temperature within the range of 160° to 220° C. in the presence of a catalyst selected from the group consisting of a Group VIII noble metal and a Group VIII noble metal salt supported on an inert carrier.

References Cited

UNITED STATES PATENTS

| | | | |
|---|---|---|---|
| 1,536,706 | 5/1925 | Ernst et al. | 260—650 |
| 2,399,488 | 4/1946 | Hearne | 260—659 |
| 2,838,577 | 6/1958 | Cook et al. | |
| 2,870,225 | 1/1959 | Cooley et al. | |
| 3,214,482 | 10/1965 | Caropreso et al. | 260—659 |

LEON ZITVER, *Primary Examiner.*

N. J. KING, JR., H. MARS, *Assistant Examiners.*